Figure 1:
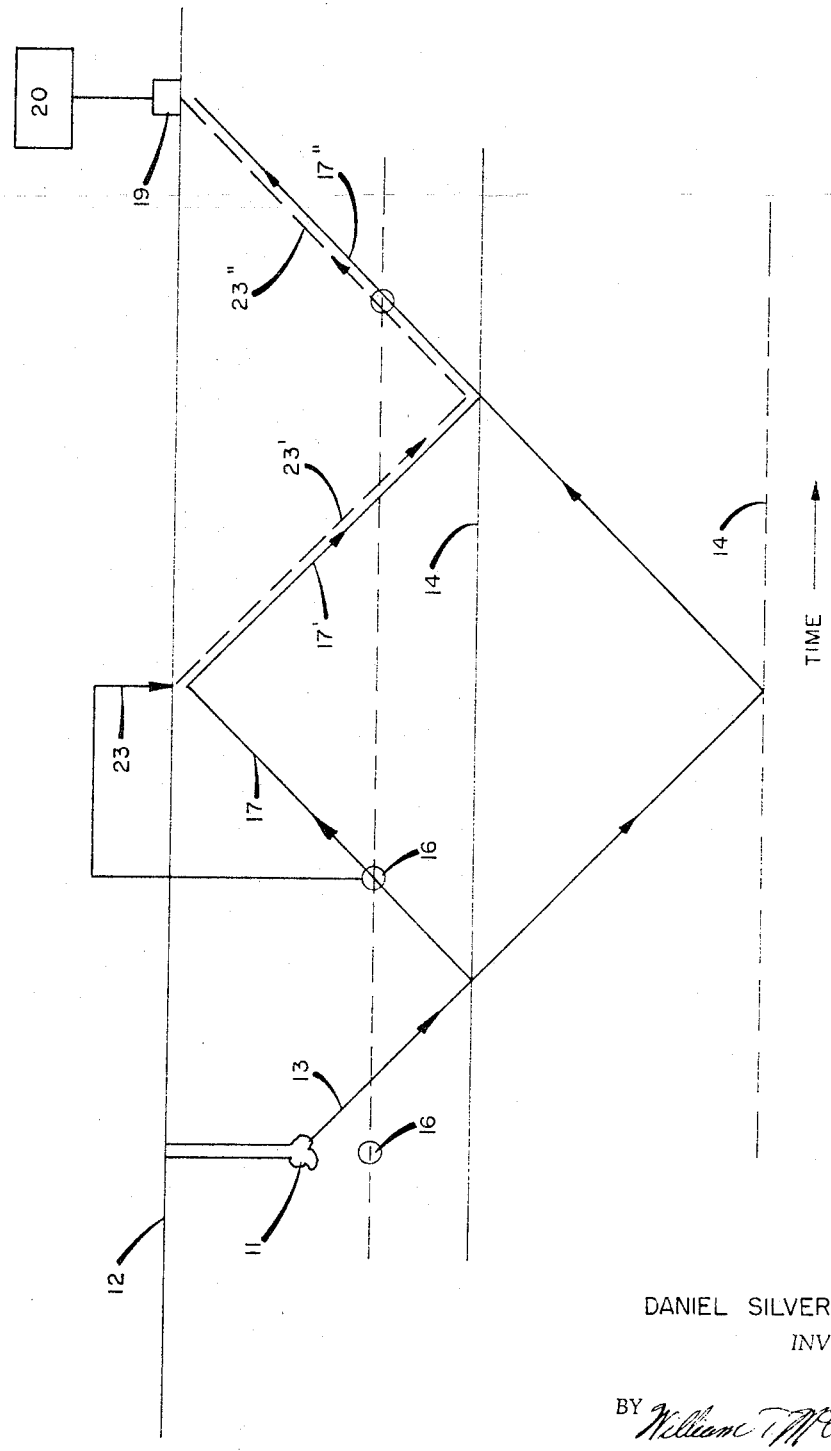

DANIEL SILVERMAN
INVENTOR.

BY William T. McClain
ATTORNEY.

DANIEL SILVERMAN
INVENTOR.

BY William T. McClain
ATTORNEY.

Oct. 11, 1966     D. SILVERMAN     3,278,893
REDUCING THE EFFECT OF MULTIPLE REFLECTIONS
OF SEISMIC WAVE SIGNALS
Filed Aug. 27, 1963     5 Sheets-Sheet 5

DANIEL SILVERMAN
INVENTOR.

BY William T. McClain

ATTORNEY.

United States Patent Office 3,278,893
Patented Oct. 11, 1966

3,278,893
REDUCING THE EFFECT OF MULTIPLE REFLECTIONS OF SEISMIC WAVE SIGNALS
Daniel Silverman, Tulsa, Okla., assignor to Pan American Petroleum Corporation, Tulsa, Okla., a corporation of Delaware
Filed Aug. 27, 1963, Ser. No. 304,795
35 Claims. (Cl. 340—15.5)

This invention relates to seismic prospecting, and more particularly to a method and apparatus for identifying, altering, or eliminating multiple reflections of seismic wave signals.

The method of geophysical exploration employing seismic waves transmitted through the earth is well known. In one such method, the general technique comprises impressing an impulse signal on the earth near its surface by an explosive charge or transducer so that the resulting waves are transmitted downwardly through the earth to strike one or more subterranean reflecting interfaces from which the seismic signals are reflected upwardly towards the earth's surface. Discontinuities or variations of structure within the earth will present an interface which will reflect a portion of the energy in the waves. The up-traveling reflected waves may be detected at a receiving point and the depth of a particular subterranean interface reflecting the waves may be determined by measuring the travel time required to pass a seismic signal from the point of initiation to the receiving point.

Typically, signals produced by a detector of the reflected waves are recorded on a trace which comprises a record of a series of waves arriving at a detection point at varying times, depending upon the paths followed in the earth. Primary reflections, or those waves directly reflected from an interface with only one reversal of direction, are utilized in determining the depth of the interface. However, due to the presence of many structural and acoustical variations, the seismic waves may be reflected back and forth between a number of interfaces so that more than one reversal of direction occurs and multiple reflections are produced. Multiple reflections resulting from the re-reflection of seismic waves, either from the surface of the earth or from one or more reflecting interfaces below the surface, frequently seriously interfere with the seismographic interpretation. For example, multiple reflections may be confused with primary reflections and may arrive at a detection point at times which would erroneously indicate a structural variation at a certain distance below the surface. Further, they may make it impossible to identify primary reflections. A detailed discussion of multiple reflections may be found in the January 1948 issue of the publication "Geophysics," pp. 1–58, vol. XIII. The problems presented by the occurrence of multiple reflections have placed undesirable limitations on the capabilities of seismic exploration. Various techniques have been suggested for minimizing certain types of multiple reflections. Also, there are certain characteristics by which multiple reflections can be recognized under certain conditions. However, these techniques have been very limited in their use.

As used herein, the term "multiple reflections" refers to seismic events produced on a seismographic record due to substantially vertically traveling waves which undergo more than one reversal of direction in the earth.

A general object of the present invention is a method and apparatus for identifying, altering, or eliminating multiple reflections. Another object of the invention is a method and apparatus for substantially cancelling multiple reflections resulting from a seismic disturbance, which method and apparatus are simplified, economical and accurate. These and other objects will become apparent from the following description of the invention.

In accordance with the present invention, there is provided a seismic prospecting system wherein a seismic wave signal, derived from a first seismic wave signal transmitted through the earth, is employed in the determination of geological structures.

The present invention contemplates a method of seismic prospecting which comprises impressing on the earth a first seismic wave signal to be transmitted through the earth, and detecting said first signal transmitted through the earth to a second location. A second seismic wave signal is derived from the detected signal. The second seismic wave signal is then impressed on the earth, and a signal is produced which is a function of the transmitted first and second seismic signals. A display, typically a record, such as a seismographic trace, is then produced in which primary reflections of the first seismic signal are selectively indicated with respect to multiple reflections. In one embodiment of the invention the transmitted first seismic signal is detected and employed to produce a second seismic wave signal reversed in phase from the detected signal, which second seismic wave signal, after an appropriate time delay is transmitted into the earth to arrive at a detection point cotemporaneously, or substantially simultaneously, with said first signal to cancel or selectively alter multiple reflections thereof.

In another embodiment, the transmitted first seismic wave signal is detected and recorded, and, after an appropriate time, the first seismic signal is repeated. A second seismic wave signal is derived from the detected first seismic signal, but reversed in phase therefrom, and applied to the earth at such a time as to arrive at a detector simultaneously with the repeated first seismic signal to cancel or alter multiple reflections thereof. Also, the first detected seismic signal may be recorded and the second seismic signal derived from the first detected signal, applied to the earth and transmitted therethrough, with the transmitted derived signal being detected and recorded. Then, a function of these two recorded signals may be computed and recorded to provide a trace in which the multiple reflections are cancelled. In still another embodiment, the second seismic signal which is derived from the first seismic signal may be employed, without reversing its phase from the first signal, to alter the multiple reflection signals so as to permit their identification.

Figure 2:
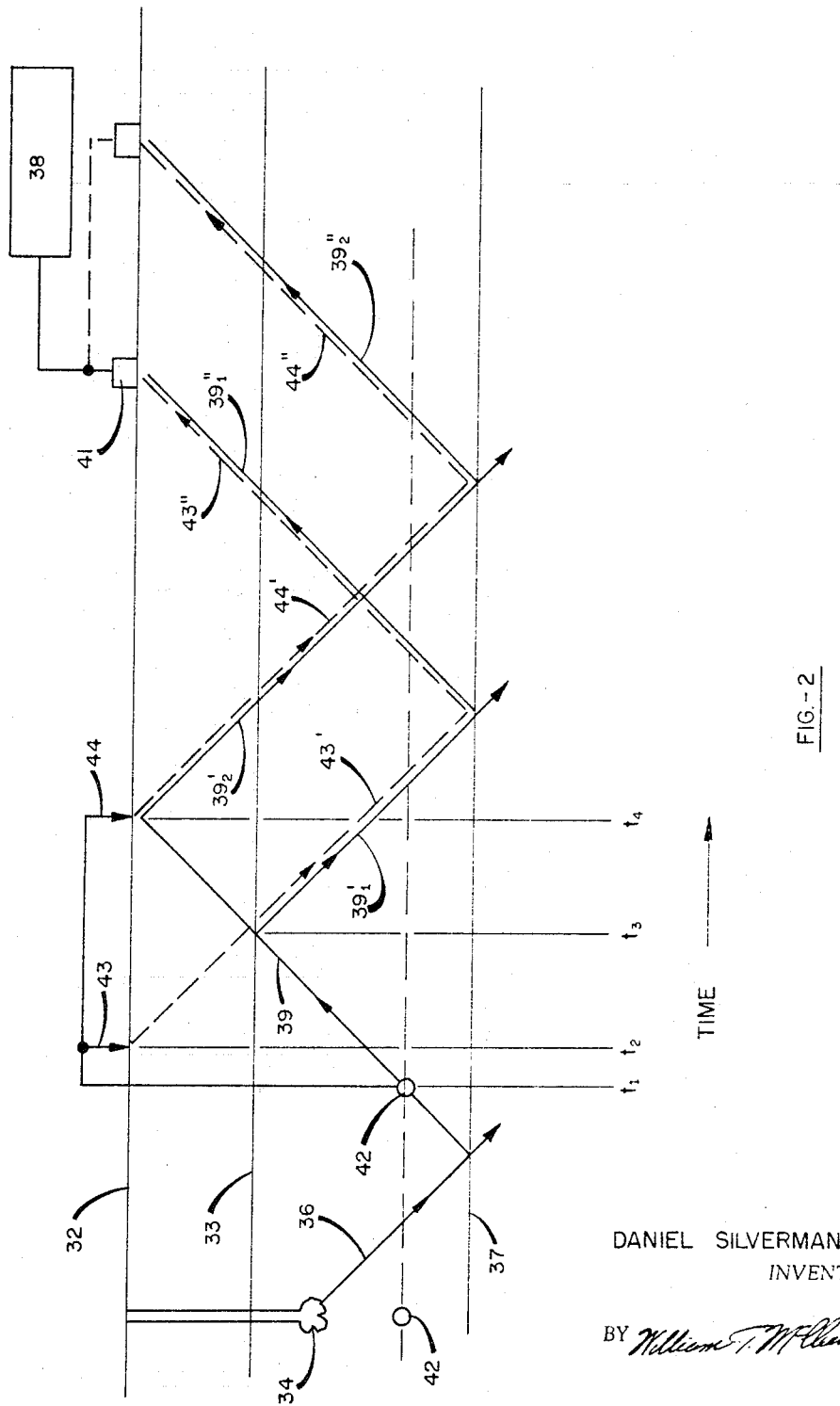
Figure 3:
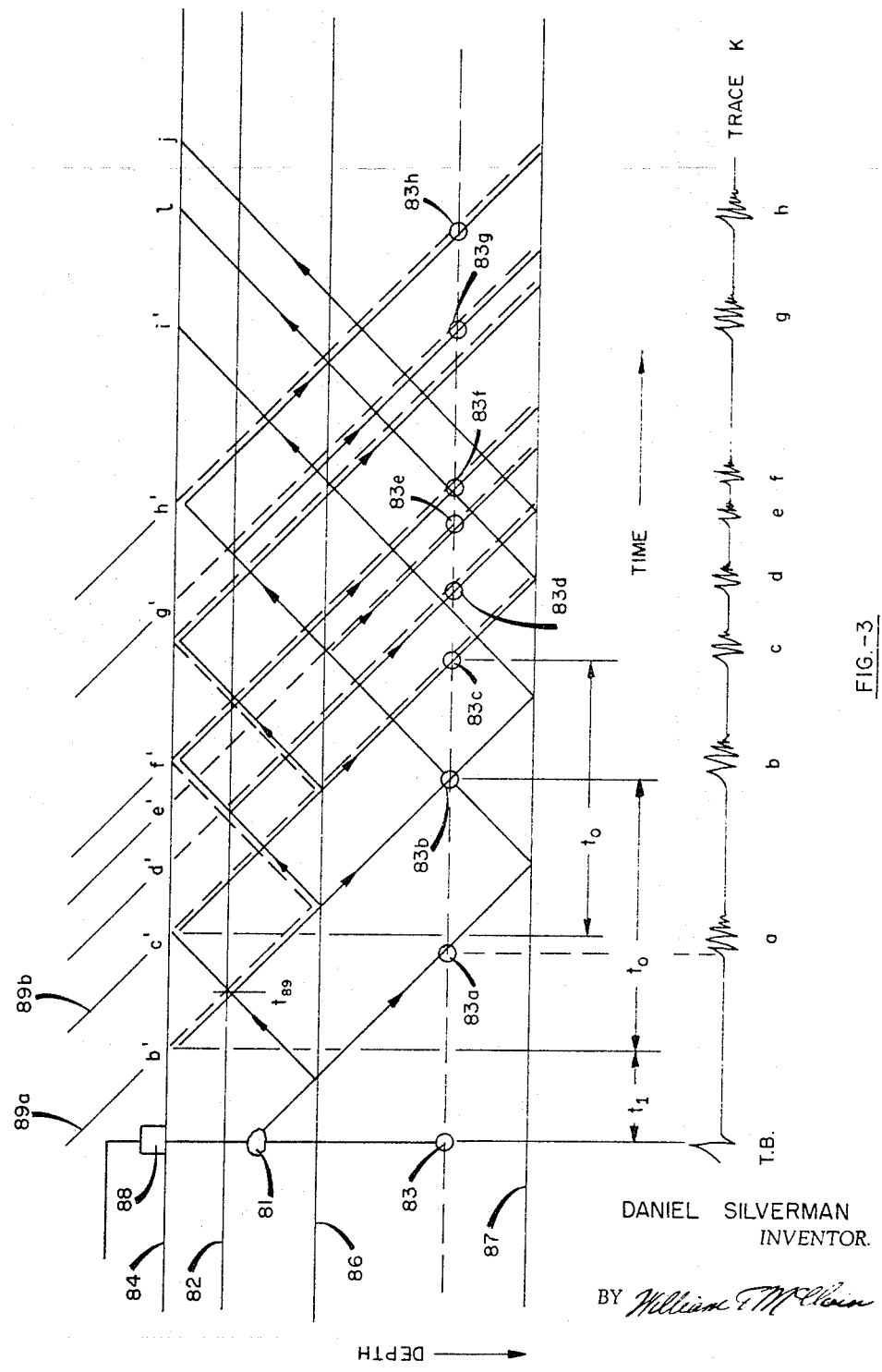
Figure 4:
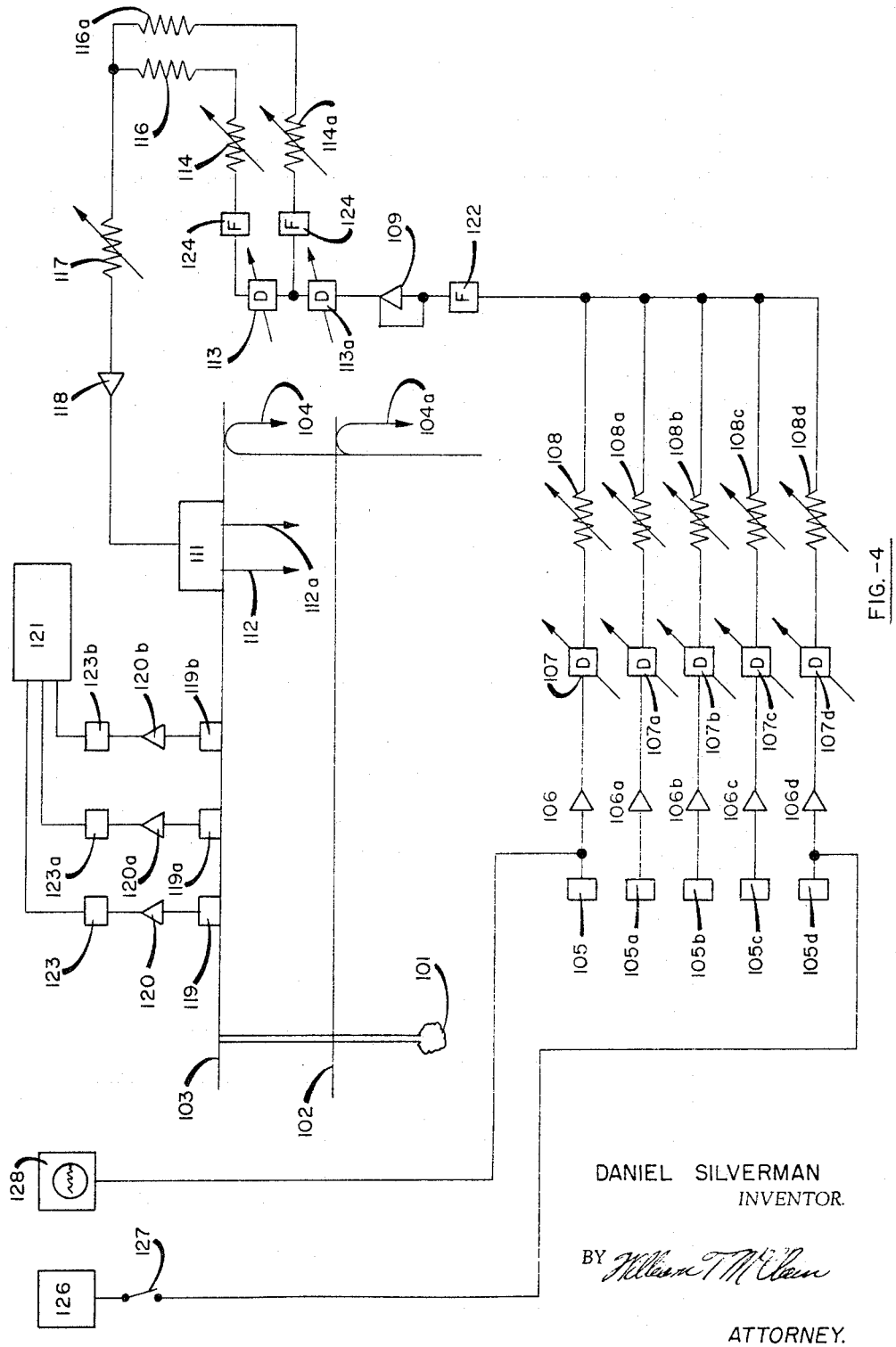
Figure 5:
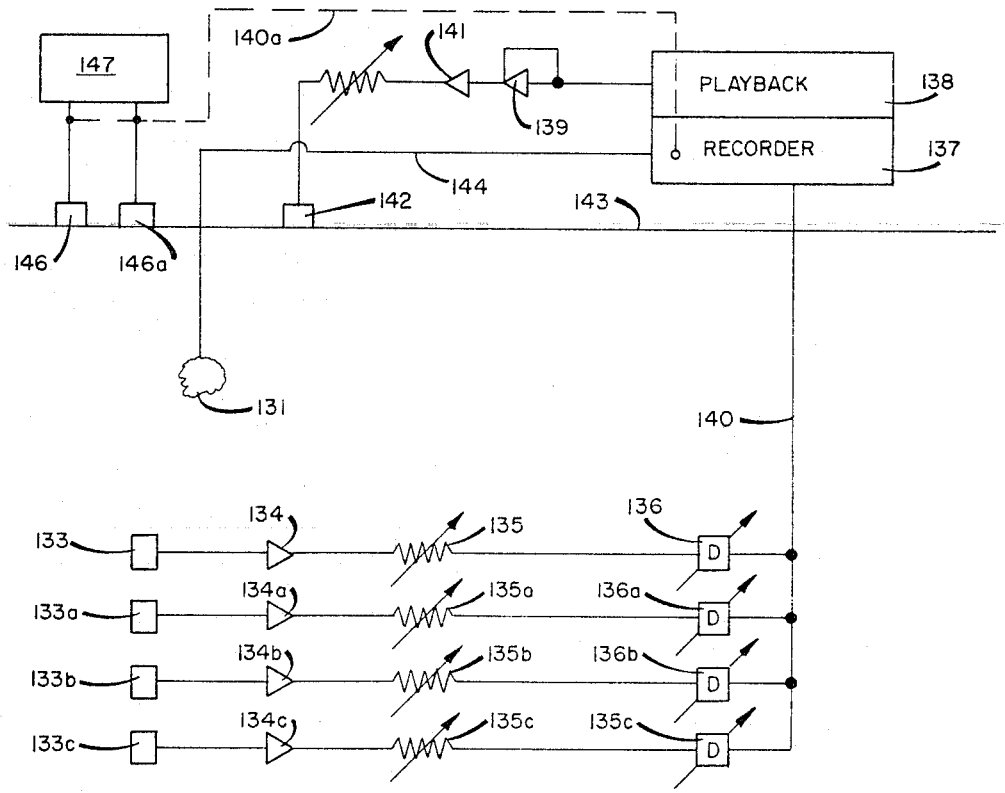
Figure 6:
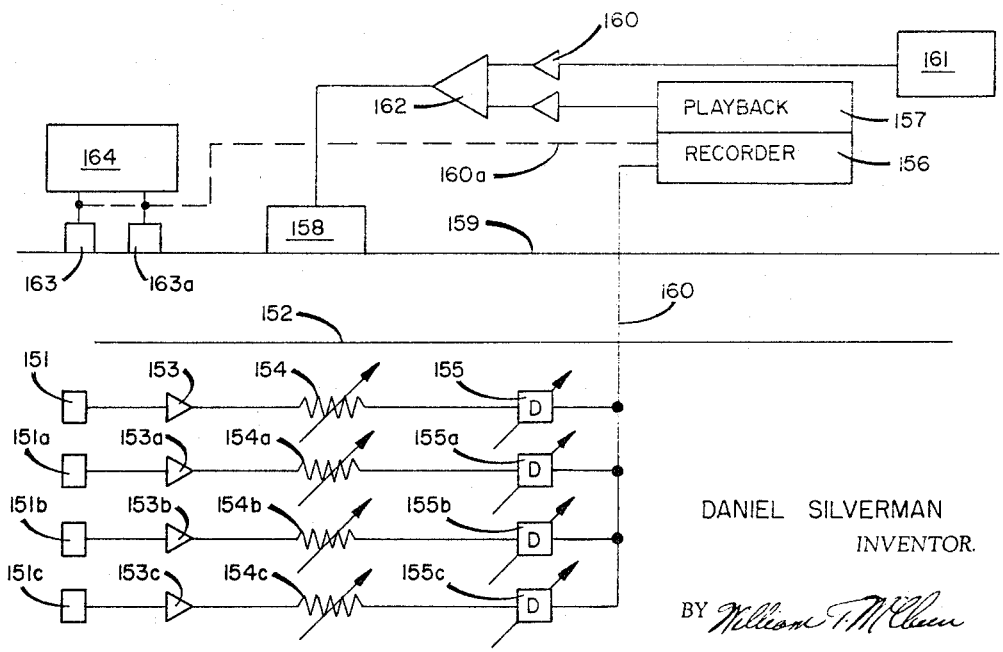

My invention will be more fully understood by reference to the following description of preferred embodiments thereof and the accompanying drawings wherein:

FIGURE 1 is a diagrammatic representation in simplified form of a seismic ray diagram depicting the method employed in practicing the present invention; and FIGURE 2 diagrammatically illustrates a more complex version of FIGURE 1; and FIGURE 3 is illustrative of another manner of practicing the method of the present invention; and FIGURE 4 schematically illustrates an embodiment of apparatus employed in the cancellation of multiple reflections; and FIGURE 5 schematically illustrates apparatus according to the invention wherein intermediate storage of a detected seismic signal is employed in the cancellation of multiple reflections; and FIGURE 6 is illustrative of an embodiment of the apparatus of FIGURE 5 wherein a single transducer is employed in producing the first seismic wave signal and a second seismic wave signal.

The operation of the present invention will be better understood by reference to FIGURES 1 and 2, wherein (1) ray diagrams are shown for the cases where only multiple reflections caused by the earth's surface are considered and (2) where only the earth's surface and the base of weathering are considered as sources of multiple reflections. In practice, of course, many reflecting interfaces are present due to the large number of structural variations in the earth. With a larger number of subterranean reflecting interfaces the complexity of the ray diagrams increases markedly. However, the multiple reflections caused by the earth's surface and the base of weathering generally are most troublesome. Hence, these two basic cases will be considered for purposes of clarity and simplicity, although the principles herein set forth are also applicable to the more complex systems.

FIGURES 1 and 2 are simplified diagrammatic representations of reflected ray paths showing paths for primary reflections and first-order multiple reflections. The vertical axis represents vertical distance from the earth's surface expressed in time and the horizontal axis represents travel time measured from the source of seismic wave signals (shown at the left). The solid horizontal lines represent reflecting interfaces, while the solid diagonal lines represent ray paths. This method of representation permits separate lines to represent different ray paths even though all the waves are traveling substantially along overlapping vertical paths. The horizontal dashed line merely represents the position of a single seismic detector in the earth.

Referring to FIGURE 1, a source of a first seismic wave signal 11 is appropriately located in seismic wave transmitting relation with the earth for applying to the earth a first impressed seismic wave 13 which travels downwardly to strike a seismic-wave-reflecting interface 14 from whence a portion of the wave energy is reflected upwardly towards the earth's surface as a transmitted wave 17 to form a primary reflection. Upon arriving at the earth's surface, the transmitted wave is reflected downwardly as 17' to interface 14 and re-reflected toward the surface again as 17" where it appears as a multiple reflection. On a seismographic trace made by recording the signals produced by detector 19, the multiple reflection 17" would not be readily distinguishable in waveshape from the primary reflection 17, but arriving later than primary reflection 17 would erroneously indicate a fictitious interface 14' at some distance beneath the reflector 14.

If a seismic wave detector means 16 is positioned in the earth at a depth below the surface 12, which causes multiple reflection 17", the detector will receive the up-traveling reflected wave 17 prior to the time it arrives at the surface. Upon receiving the transmitted wave, the detector 16 produces a detected signal from which a second seismic wave signal 23 is derived and then applied to the earth to travel as ray 23', be reflected at interface 14, and return as 23", and to arrive at detector 19 cotemporaneously, or substantially simultaneously, with the re-reflected transmitted wave 17', 17" at the surface 12 to selectively alter or cancel multiple reflection 17" thereof.

Typically, the seismic wave detector 16 is a transducer system, or preferably, a vertical array of seismometers, producing an electrical output, or detected signal, which is appropriately amplified, delayed in time, and applied to a transducer which generates the second, or derived, seismic wave signal 23, which is of a controlled amplitude and may be reversed in phase from the first detected seismic wave signal 17. An attenuator may be employed to closely balance the derived signal 23 with the reflected signal 17 transmitted to the location of the energy source, or transducer, which impresses the derived signal 23 on the surface of the earth. The time delay will be such as to cause the equal amplitude and opposite phase of the derived signal to be applied to the earth to arrive as 23" simultaneously with the transmitted first signal 17', 17" at the detector 19 on the surface. In this instance, the derived signal impressed upon the earth will effectively cancel multiple reflection 17", and the record of the output from detector 19 provided by recorder 20 will thus have this multiple reflection 17" selectively cancelled with respect to the primary reflection 17. This same analysis can be applied to additional reflections and re-reflections in which all the multiple reflections involved in reflections downward from the surface 12 will be altered or modified with respect to the primary reflections.

Referring again to FIGURE 1, it will be clear that it is the downward reflecting interface 12, at the surface of the earth, cooperating with the upward reflecting interface 14 that produces the multiple reflection 17". Other reflecting horizons below interface 14 will produce additional multiples which will also be cancelled, as is 17"', by the seismic wave signal 23 introduced into the earth in response to the up-traveling signal 17 detected by detector 16.

In those locations on the earth covered by a layer of water, such as rivers, lakes, bays, etc., a similar situation arises, in which the reflector 12 is the surface of the water, the reflector 14 is the interface between the water in the space between 14 and 12, and the earth below 14. Both the source of seismic waves 11 and the detector array 16 are immersed in the water. This particular situation is a very common one in seismic exploration and produces very strong multiple reflections or water reverberations. However, the process described in connection with FIGURE 1 on land applies equally as well for a liquid layer over land. That is, the up-traveling wave 17 reflected off the sea bottom 14 is detected, and signal 23 is generated and introduced into the liquid at 23 at the same time that the signal 17 reaches the surface of the liquid 12. Of course, in the case of a water layer, the detector 16 and transducers 23 might be constructed differently than if used on land. In any case, my process will work so long as the source 11, transducer 23, and detectors 16 and 19 are in seismic wave transmitting relation with the earth, whether in direct contact with the solid earth, or through some intervening medium such as water, or even air.

As referred to herein, the energy sources employed for generating the various seismic wave signals may be of varying types, with the location of the source, i.e., at above, or below the surface of the earth or in water layers on top of the earth, determined by the circumstances of each application. Seismic wave signals may be generated, for example, by conventional transducers of the electromechanical, hydraulic or pneumatic type, a solid or gaseous explosive charge, a dropping weight or an engine-driven source. Explosive charges generally produce a seismic wave signal of less than about 200 milli-seconds duration, and distributed charges, which direct the energy downward, are particularly desirable for use beneath the surface, since these produce a minimum of secondary signals. Vibrators generally produce seismic wave signals of longer duration, i.e., greater than one-half second, and the sweep, or wavetrain, may be varied as desired. A vibrator often used is one which produces a nonrepetitive vibratory signal. Vibrators most often are positioned on and act upon the surface of the earth, however, they may be set on the surface and act on the subsurface by means of a pipe extending into a hole secured to the vibrator at its top and to the earth at its bottom end.

As described in connection with the accompanying drawings, an energy source, or transducer is referred to for applying to the earth a cancellation seismic wave signal which is derived from a previous seismic wave signal transmitted through the earth and received by a seismic detector. Typically, an electrical signal from the detector is supplied to the transducer to produce the cancellation signal. A transducer which will faithfully reproduce in mechanical motion the waveshape of the electrical signals supplied to it is relatively difficult and expensive to manufacture. Therefore, it may be found desirable to employ for this purpose a simplified transducer which imparts pulses into the earth in synchronism with the electrical signal received, but which does not exactly follow the continuous amplitude variations of the signal. Further, the characteristics of the seismic waves being transmitted through the earth likely will be altered so that a wave arriving at a given location will not exactly correspond to the input applied to the earth. The cancellation signals generated by the transducer need not in all cases exactly correspond to the multiple reflections to be cancelled, and a cancellation signal which, upon being received at the detector location, produces an alteration, or change, in the seismic trace, sufficient to permit identification of the multiple reflections, may be used if desired. Thus, the reference herein to the cancellation of multiple reflections shall be understood to mean complete or partial cancellation, or any alteration, change or modification of a seismic wave, or a trace thereof, which is produced in accordance with the principles of the present invention.

In FIGURE 2, two troublesome sources of multiple reflections are present, the earth's surface 32 and the base of weathering 33. An energy source 34 of a first seismic wave signal is positioned beneath the reflecting interfaces 32 and 33 which give rise to multiple reflections, and a first impressed seismic wave signal 36 is applied to the earth to travel downwardly to strike the next lower subterranean interface 37 and be reflected upwardly as primary reflection 39. As before, detector means 42 receives the up-traveling transmitted wave 39 at time $t_1$ to provide a detected signal from which a second set of seismic wave signals are derived. The second seismic signals 43, 44 are then impressed on the earth by an appropriate energy source, typically after appropriate amplification, time delay, and reversal of phase, to arrive at detector means 41 and effectively cancel multiple reflections $39_1''$ and $39_2''$ of transmitted waves 39 on the record of the detector output provided by recorder 38. For example, derived signals 43 and 44 are impressed on the earth at times $t_2$ and $t_4$, respectively, such that their waves arrive at interfaces 33 and 32, at times $t_3$ and $t_4$, respectively, simultaneously with the arrival of transmitted signal 39. The impressed signals 43', 44' are of such magnitude and phase to the reflected components of transmitted wave 39 arriving at each of the interfaces 33 and 32, that after traveling to interface 37 and back to detector 41 at the surface, multiple reflections $39_1''$ and $39_2''$ are selectively cancelled on the resulting seismographic trace by signals 43'' and 44'', respectively.

From the foregoing, it is apparent that the detector means employed to detect the up-traveling reflected signals must be located at a depth great enough to provide sufficient time to detect the up-traveling signal, derive the second seismic wave signal and put the second wave signal into the earth so that it effectively cancels or alters the multiple reflections of the first seismic wave signal. In the event there is insufficient time to effectuate this, say, because of local conditions or the nature of the equipment available, the transmitted first seismic wave signal received at the subsurface detector 42 may be recorded, as on a magnetic recorder (as hereinafter described), and held temporarily in intermediate storage on magnetic tape. Then, the first seismic signal is repeated and transmitted through the earth as before. A second seismic wave signal is derived from the recorded signal as mentioned above and applied to the earth to effectively cancel or otherwise alter multiple reflections of the repeated first signal, as previously described. Of course, the timing of the second signal is such as to cause the transmitted second signal to arrive at a detector location simultaneously with the transmitted repeated first signal.

FIGURE 4 illustrates typical apparatus employed in the practice of the invention as described in connection with FIGURE 2. An energy source 101, for generating a first seismic wave signal and applying it to the earth, is positioned beneath the earth's surface 103, typically, below the base of weathering 102. For example, an explosive charge, typically producing a seismic wave signal of less than about 200 milliseconds may be employed below the surface and preferably this source is a distributed charge which mainly directs the energy downward, so that a minimum of secondary waves are generated. Alternatively, a vibrator, typically producing a seismic wave signal having a duration of about one-half second or greater may be employed at the surface of the earth, or in a hole beneath the surface. The surface 103 and the base of weathering 102 produce downward reflections 104 and 104a, respectively, of the original signal transmitted from the energy source 101. A vertical spread of a plurality of spaced apart seismometers 105, 105a, 105b, 105c, etc., is located below the base of weathering to detect up-traveling reflections from subterranean interfaces. These seismometers receive the transmitted first seismic wavetrain and each produces an electrical output, which outputs are amplified by corresponding amplifiers 106, 106a, 106b, 106c, etc., and individually delayed in time by corresponding delay units 107, 107a, 107b, 107c, etc., and attenuated by corresponding attenuators 108, 108a, 108b, 108c, etc., so as to obtain a maximum summation for the up-traveling reflected waves.

An energy source 111, advantageously a vibrator in contact with earth's surface, is employed to apply to the earth a second set of seismic signals 112 and 112a which are derived from the detected signal produced by the vertical spread of seismometers. Since downward reflections 104 and 104a have different amplitudes and times of arrival at their respective reflecting interfaces, derived signals 112 and 112a each have an amplitude and timing appropriate to cancel downward reflections 104 and 104a, respectively. This is accomplished by passing the delayed, reverse-phase signal to vibrator 111. There are provided delay units 113 and 113a, attenuators 114 and 114a and adding resistors 116 and 116a connected to total attenuator 117 and power amplifier 118 which feeds signals of the appropriate amplitude and timing to the vibrator 111. Thus, derived signal 112a is impressed on the earth by vibrator 111 at a time so that it reaches the base of weathering 102 at the same time transmitted signal 104a arrives at that point. Correspondingly, derived signal 112 is delayed until transmitted signal 104 arrives at the surface 103. Since derived signals 112 and 112a are substantially equal and opposite to transmitted signals 104 and 104a, respectively when all four signals reach the surface, multiple reflections which would otherwise result on recorder 121 are effectively cancelled.

In the system described above, seismic signals 112, 112a are introduced into the earth over a relatively small area, such as the base of the energy source 111. As the waves 112, 112a travel downward to the lower reflecting horizons and are returned to the surface, they spread out (as an expanding spherical surface). Thus, when this wave front reaches the detectors 119, 119a, 119b, etc., which individually only contact a small area of the earth, only a very small portion of the energy in the waves 112, 112a eventually reach these detectors. Similarly, the energy in the reflected seismic signals 104, 104a spread out during the travel down to the deflecting horizon and back to the surface to the detectors 119, 119a, 119b, etc. Thus, only a small part of the energy in 104, 104a eventually reach the detectors. Also, the signals 104, 104a are reflected downward from a substantial area of the interfaces 103 and 102. So the energy density in the reflected signals 104, 104a at the time they start downward is not necessarily the same as that in the signals 112, 112a introduced into the earth. In general, the energy per unit area of earth's surface in 112, 112a will generally be higher than in the signals 104, 104a. The important relation is that when signals 104, 104a, and 112, 112a finally are reflected upwardly from the deep interface and again reach the surface, their energy densities will be substantially equal and preferably in opposite phase so that arriving signals 112, 112a will cancel signals 104, 104a, respectively.

A plurality of spaced-apart surface seismometers 119, 119a, 119b, etc., aligned on the surface 103 receive the resultant, or sum, of signals 104 and 112 and of 104a and 112a and each provide an electrical output which is amplified by corresponding amplifiers 120, 120a, 120b, etc. The amplified signals are then recorded on a conventional seismic recorder 121 to provide a seismographic trace of the resultant of the above signals.

Filter 122, or separate filters 124, 124a, may be provided to obtain a portion of the spectrum of the total signal from the vertical spread of detectors which signal corresponds to the signals received and recorded at the surface 103 and to take into account the filtering of the weathered layer, etc., on the derived signals impressed on the earth. Low frequency signals are generally advantageous to use, and filters 123, 123a and 123b, along with filters 122 and 124a, 124b may be tuned to low frequencies.

It may be desirable in some circumstances to pretest the earth and the above-described system to be employed in the practice of the invention. This may be done by connecting pulse generator 126 to detector 105d through switch 127, which may be a repetitive switch. This will send a wave upward which is received by detector 105 to which is connected an oscilloscope 128. The output signal of detector 105 will be passed through amplifier 106, delay unit 107, attenuator 108, filter 122, phase inverter 109, delay units 113 and 113a, etc., to vibrator 111. The vibrator will impress upon the earth signals 112 and 112a which will be transmitted through the earth back to detector 105, as will multiple reflections 104 and 104a mentioned above. If these pulses are not in proper time relation, then appropriate adjustments can be made. For example, by making the pulse applied to detector 105d short, and appropriately setting the delay units, four separate downgoing pulses will be received by detector 105 and recorded. Oscilloscope 128 can best be used to display these signals by setting it to sweep each time switch 127 is closed, or each time the pulse is generated. By using the oscilloscope and repeating the signal applied to detector 105d, the proper setting of delay units 113, 113a, can be determined when pulses 104 and 104a are in synchronism, respectively, with signals 112 and 112a. At the same time, of course, the effect of the filters employed in the system can be explored. If an examination of the oscilloscope should indicate that more than two pulses, 104 and 104a are present, then additional delay units 113 and attenuators 114 can be added to the system. In this manner the earth detection and feed-back system can be pretested before the actual test signal is applied to the earth.

Turning now to FIGURE 3, there is shown a ray diagram, similar to those described above, wherein a source of energy 81 is located in the earth below the base of weathering 82 for generating and applying to the earth a first seismic wave signal. A detector means 83, such as a vertical spread of seismometers, is positioned beneath the source 81 at some distance from the earth's surface 84 to receive seismic wave trains resulting from the application of seismic waves to the earth by source 81. In this instance, only the down-traveling seismic events are detected and recorded on seismographic trace K, shown below the ray diagram, on which are plotted the arrival times and amplitudes of signals received at the detector.

Thus, event "a" represents the direct arrival at detector 83 of a seismic wave signal from source 81; "b" represents the arrival time of a signal after reflection from subterranean interface 86 and re-reflection downwardly from the base of weathering 82 to detector 83; "c" represents the arrival time of a signal after reflection from interface 86 and surface 84 downwardly to detector 83, etc. These downwardly reflected events will eventually return to the surface 84 as multiple reflections, for example, after reflection upwardly from interface 86 to reach surface 84 at time $f'$, or after reflection upwardly from interface 87 to reach the surface at time $i'$, etc.

To cancel the multiple reflection arriving at $f'$, for example, a cancelling, or correcting seismic event is introduced into the earth, as with transductor 88, at a time such that the cancelling signal arrives at a surface detector simultaneously with the up-traveling multiple reflection, and, of course, the correction signal should be of approximately equal magnitude and opposite phase to the signal originated by source 81 as the two signals arrive at a detector on the surface 84 at time $f'$.

The primary event 89 arrives at surface 84 at time $c'$. Thus, cancelling signal 89b is introduced into the earth by transducer 88 at time $c'$. This same primary event 89 reflects downwardly from the base of weathering 82 at an earlier time $t_{89}$, since it does not have to travel through the weathered layer. However, to cancel this downwardly reflected event, a correction signal 89a must be introduced at earlier time $b'$, as mentioned above, since this correction signal must travel down to interface 82 and arrive in time to meet up-traveling primary signal 89.

Examination of the trace K and the ray diagram shows that the time differential between the input of signals 89a and 89b is the same as that between recorded events $b$ and $c$ on trace K. Also, the relative strengths of the downwardly reflected portions of primary 89 are given by the amplitudes of events $b$ and $c$ on the trace. Thus, the trace K, beginning with event $b$, can be used to derive a cancellation signal put into the earth by transducer 88.

To carry out the method described above, seismographic apparatus can be arranged as shown in FIGURES 5 and 6. As shown in FIGURE 5, an energy source 131, such as a distributed charge, is positioned in the earth for generating and applying to the earth a first seismic wave signal, with a vertical spread of seismic detectors 133, 133a, 133b, 133c, etc., located beneath source 131 to receive the downgoing seismic signals resulting from the application to the earth of a seismic wave signal by source 131. The subsurface detectors each produce a detected signal which is amplified by corresponding amplifiers 134, 134a, 134b, 134c, etc., attenuated by corresponding attenuators 135, 135a, 135b, 135c, etc., and delayed in time by delay units 136, 136a, 136b, 136c, etc., and composited for passage to a recorder 137, such as a magnetic tape recorder to provide a reproducible trace of the signal. Subsequently, the seismic wave signal is repeated by source 131, and a function of the recorded trace is produced, e.g., the recorded signal is played back by the playback unit 138 connected to recorder 137, with the played back signal being inverted in phase (if desired) by phase inverter 139, amplified by amplifier 141 and conducted to transducer 142 at the surface 143 of the earth.

Referring back now to FIGURE 3, it can be seen that, for example, event "c" on the trace K reached the surface 84 at time $c'$, which is earlier than time $c$ on the trace by time differential $t_0$. Thus the application of the corrective signal by transducer 142 will be earlier than on the recorded trace by a time differential corresponding to $t_0$. The cancellation signal, corresponding to signal 89a above, will be applied at time $t_1$ after the time break corresponding to TB on the trace K. This can be done by synchronously generating the repeated seismic signal at source 131 by a signal conducted through line 144 from the recorder 137 at a time $t_0$ before event $b$ occurs on the trace. Thus, with the proper correction for time delay in the transducer, the corrective signals arrive substantially simultaneously with the transmitted repeated signals at detectors 146, 146a spaced apart on the surface 143. The detector signals are then passed to a conventional seismographic recorder 147 which provides a seismographic trace on which multiple reflections of the repeated seismic signal are either cancelled or altered, while the primary reflections of the repeated signal are unaffected.

Alternately, a system as shown in FIGURE 6 may be employed in the practice of the invention. Typically, a vertical spread of seismic detectors such as a plurality of spaced apart seismometers 151, 151a, 151b, 151c, etc., is positioned in the earth below the base of weathering 152 and connected through corresponding amplifiers 153, 153a, 153b, 153c, etc.; attenuators 154, 154a, 154b, 154c, etc.; and delay units 155, 155a, 155b, 155c, etc., to a recorder providing a reproducible record of the composite detector signals, such as magnetic recorder 156 and playback unit 157 providing an electrical signal which is a function of the recorded seismic signals. A transducer, such as vibrator 158, is in contact with the earth's surface 159 to apply a first seismic wave signal to the earth. A transducer signal preparation unit 161, or control unit providing an electrical signal of predetermined characteristics, such as provided by a previously prepared standard record, is connected to transducer 158, through amplifier 160 and adder 152 to provide a signal of the desired frequency, duration and magnitude from the transducer. The transmitted first seismic wave train resulting from the transducer is detected by the vertical spread of subsurface detectors and recorded as mentioned above. Subsequently, the recorded wave train signal from the first seismic signal recorded by recorder 156 is played back by unit 157 and added by adding amplifier 162 to a repeat of the first signal from preparation unit 161, and the summed electrical signal, which is a function of the repeated first seismic signal modified by the recorded transmitted first signal, is applied to the earth by transducer 158. Seismic detectors 163, 163a, etc., positioned on the surface 159 receive the resultant seismic signal after transmission through the earth, and their signal outputs are recorded on conventional recorder 164. Instead of recording on recorder 156, the signals produced by subsurface detectors 151, it is possible as mentioned above to directly apply the detected signals to the adding amplifier 162.

While the up-traveling reflected seismic signals may be employed to derive the correction signal in the embodiments of the invention described above in connection with FIGURES 3, 5 and 6 for direct feed-back, the down-going signal is preferable for this purpose, since the latter more nearly approximates the characteristics of the re-reflected signals 104 of FIGURE 4 which produce multiple reflections of the first seismic wave signal. The seismic wave signals can be detected by a subsurface transducer or an array of transducers arranged for either upward or downward compositing. For the case where the only re-reflection downward is from the surface, the detector can be placed at the surface. Identification of the seismic events on the record which are multiple is based on the fact that, by varying the amplitude or phase of the second, or derived, seismic wave signal, certain events can be varied in magnitude or shape without affecting the other events. Here, the primary reflections are not affected and the others that are affected are identified as multiple reflections.

In FIGURE 4 there is shown an arrangement of apparatus which involves the detection of an up-traveling seismic wave signal by the detector array 105, and the substantially simultaneous re-introduction of this signal back into the earth, to be cotemporaneous with but out of phase with the downward re-reflection of the up-traveling signal. So long as this feed-back of signal is direct, that is, there is no intervening recording step, although there may be delay, the detector array 105 must be placed below the reflecting interfaces 102 and 103 that will create the downward re-reflected signals 104, 104a.

In FIGURES 5 and 6 there is shown the case where the signals detected by the detector array 133 are carried to and recorded on magnetic tape recorder 137 (or by 151 and recorded on 156). In this case there is no time requirement as to the placement of the detector arrays 133 or 151, only that they be placed below the lowest layer 102 (FIGURE 4) at which downward re-reflections are expected to occur. Here, either the up-traveling or down-traveling signals can be recorded, although I prefer to use the down-traveling signals.

If there is only one reflecting interface 103 (FIGURE 4) and if a recorder is to be used, the detector that records the up-traveling or down-traveling wave can be at the surface since the surface detector will record this seismic wave signal just at the time it arrives at the surface. Thus, in this case (for a single downward-reflecting interface) the first detector can be at the surface, as can also be the second detector. In fact, a single detector means can serve not only to record the first up-traveling seismic wave signal but also to detect and record the sum of the first and second seismic wave signals. In such an instance, the single detector means may be connected to recorder 137 or 156 by connectors 140a or 160a, respectively.

In a similar way, when a vertical array of detectors 105, 133, or 151 are used to detect the first seismic wave signal, they can also be sued to detect the sum of the first and second seismic wave signals. Thus only one detector means is essential, although for convenience two or more sets of detectors may be used to facilitate operations.

Various modifications and alterations in the details of construction and method of operation will become apparent to the artisan from a reading of the foregoing description of the present invention and such modifications and alterations may be made without departing from the spirit and scope of the invention.

I claim:

1. A method of seismic prospecting which comprises impressing on the earth a first seismic wave to be transmitted through the earth; detecting the resulting transmitted first seismic wave to provide a first detected signal; deriving a second seismic wave from said first detected signal; impressing on the earth said second seismic wave to be transmitted through the earth; producing a second signal which is a function of the first and second seismic waves after each such first and second seismic waves has been transmitted through the earth; and employing said second signal in the determination of geological structure.

2. A method of seismic prospecting which comprises transmitting a first seismic wave signal through the earth from a first location; detecting the transmitted first seismic wave signal after transmission through the earth at a second location spaced from said first location to provide a first detected signal; producing a second seismic wave signal derived from said first detected signal; transmitting through the earth said second seismic wave signal; detecting the sum of said transmitted first seismic signal and said transmitted second seismic signal to provide a second detected signal; and employing said second detected signal in the determination of geological structure.

3. A method of seismic prospecting which comprises transmitting through the earth from a first location a first seismic wave signal to be reflected from at least one subterranean interface; detecting a reflection of said first seismic wave signal to provide a first detected signal; producing a second seismic wave signal derived from said first detected signal; transmitting through the earth said second seismic wave signal; detecting the sum of said transmitted first seismic wave signal and said transmitted second seismic wave signal to provide a second detected signal; and displaying an indication of said second detected signal; the phase, magnitude, and timing of said second seismic wave signal being such as to selectively alter multiple reflections of said first seismic wave signal with respect to primary reflections of said first seismic signal on the resulting record.

4. A method of seismic prospecting which comprises transmitting a first seismic wave signal through the earth from a given location to strike a subterranean seismic-wave-reflecting interface and reflect therefrom; detecting the resulting reflected signal to provide a first detected signal; transmitting through the ground a second seismic wave signal derived from said first detected signal, said second seismic signal being applied to the ground at such a time as to arrive at a detector location contemporaneously with said first seismic wave signal, the timing, phase and magnitude of said second seismic wave signal being such as to substantially alter multiple reflections of said first seismic wave signal; detecting the sum of said first seismic wave signal and said second seismic wave signal arriving at said detector location to provide a second detected signal; and providing a seismographic trace of said second detected signal wherein multiple reflections of said first seismic wave signal are selectively altered with respect to primary reflections of said first seismic wave signal.

5. A method of seismic prospecting which comprises transmitting a first seismic wave signal through the earth from a given location to strike a subterranean seismic-wave-reflecting interface and reflect therefrom; detecting the resulting reflected signal to provide a first detected signal; reproducibly recording said first detected signal; subsequently repeating the transmission of said first seismic wave signal through the earth; transmitting through the earth a second seismic wave signal derived from said recorded first detected signal; said second seismic wave signal being applied to the earth at such a time as to arrive at a detector location contemporaneously with said repeated first seismic wave signal, the phase and magnitude of said second seismic wave signal being such as to substantially alter multiple reflections of said repeated first seismic wave signal; detecting the sum of said repeated first seismic wave signal and said second seismic wave signal arriving at said second detector location to provide a second detected signal; and making a seismographic trace of said second detected signal wherein multiple reflections of said first seismic wave signal are selectively altered with respect to primary reflections of said first seismic wave signal.

6. A method of seismic prospecting which comprises transmitting a first seismic wave signal downwardly through the earth from a given location to strike a subterranean seismic-wave-reflecting interface and reflect upwardly therefrom; detecting the resulting up-traveling reflected signal to provide a first detected signal; transmitting through the earth a second seismic wave signal from a second location, said second seismic wave signal being derived from said first detected signal and being applied to the earth at such a time as to arrive at a detector location substantially simultaneously with said first seismic wave signal transmitted thereto, the phase and magnitude of said second seismic wave signal being such as to substantially alter multiple reflections of said first seismic wave signal; detecting the sum of said first seismic wave signal and said second seismic wave signal arriving at said detector location to provide a second detected signal; and recording said second detected signal to provide a seismographic trace thereof wherein multiple reflections of said first seismic wave signal are selectively altered with respect to primary reflections of said first seismic wave signal.

7. A method of seismic prospecting which comprises transmitting a first seismic wave signal through the earth from a given location; detecting the resulting down-traveling seismic wave signals to provide a first detected signal; reproducibly recording said first detected signal; subsequently repeating the transmission of said first seismic wave signal through the earth; transmitting through the earth a second seismic wave signal derived from said recorded first detected signal; said second seismic wave signal being applied to the earth at such a time as to arrive at a second detector location substantially simultaneously with said repeated first seismic wave signal transmitted thereto, the phase and magnitude of said second seismic wave signal being such as to substantially alter multiple reflections of said repeated first seismic wave signal; detecting the sum of said repeated first seismic wave signal and said second seismic wave signal arriving at said second detector location to provide a second detected signal; and making a seismographic trace of said second detected signal wherein multiple reflections of said first seismic wave signal are selectively altered with respect to primary reflections of said first seismic wave signal.

8. A method of seismic prospecting which comprises passing an electric control signal to a transducer to transmit a first seismic wave signal through the earth from a given location; detecting the resulting down-traveling seismic wave signals reflected from an interface to provide a first detected signal; reproducibly recording said first detected signal; producing an electric signal from the record of said first detected signal; adding said electric control signal and said electric signal from said record; applying the resultant of said added electric signals to a transducer to transmit through the earth a second seismic wave signal; detecting said second seismic wave signals transmitted through the earth to provide a second detected signal; and making a seismographic trace of said second detected signal wherein multiple reflections of said first seismic wave signal are selectively altered with respect to primary reflections of said first seismic wave signal.

9. A method of seismic prospecting which comprises supplying to a seismic wave signal generator a first electrical signal of predetermined characteristics to apply to the earth at a given location a first seismic wave signal; detecting the transmitted first seismic wave signal at a second location to provide a second electrical signal which is a function of the detected transmitted first seismic signal; adding said first and second electrical signals; supplying to a seismic wave signal generator a third electrical signal which is a function of said added signals to apply to the earth a second seismic wave signal; detecting said second seismic wave signal after transmission through the earth to provide a second detected signal; and providing a record of said second detected signal wherein multiple reflections of said first seismic wave signal are selectively altered in respect of primary reflections thereof.

10. A method of seismic prospecting which comprises transmitting a first seismic wave signal through the earth from a given location; detecting the resulting transmitted seismic signal after reflection from a reflecting interface in the earth to provide a first detected signal; recording said first detected signal; deriving a second seismic wave signal from said transmitted first seismic signal and transmitting said second seismic signal through the earth; detecting the resulting transmitted second seismic signal to provide a second detected signal; recording said second detected signal; and combining a function of said recorded first and second transmitted seismic signals to provide a resulting seismographic trace wherein multiple reflections of said first seismic wave signal are selectively altered in respect of primary reflections of said first seismic wave signal.

11. Apparatus for conducting seismic prospecting which comprises seismic wave generator means for applying to the earth a first seismic wave multiple frequency, discontinuous, limited time duration signal; detector means to receive said first seismic wave signal after transmission from said seismic wave generator through the earth; means connected to said detector means and responsive only to a signal therefrom to generate a second seismic wave signal derived from said detected signal and for applying to the earth said second seismic wave signal to be transmitted therethrough electrical signal; means for producing an electrical signal which is a function of said transmitted first and second seismic wave signals after at least a part of each has been simultaneously transmitted through the earth; and means connected to said electrical signal means for receiving a signal therefrom and employing said electrical signal in the determination of geological structure.

12. Apparatus for conducting seismic prospecting which comprises first seismic wave generator means in seismic wave transmitting relation with the earth for applying to the earth a first seismic wave signal; first detector means in seismic wave receiving relation with the earth to receive said first seismic wave signal after being reflected from a subterranean interface; second seismic wave generator means in seismic wave transmitting relation with the earth, connected to said first detector means and responsive to a signal therefrom to produce a second seismic wave signal derived from said detected signal; delay means connected to said second-signal generating means to apply said second seismic wave signal to the earth at such a time as to arrive at a detector location substantially simultaneously with said first transmitted seismic wave signal; detector means in seismic wave receiving relation with the earth to receive the resultant of said first and second transmitted seismic wave signals and for producing an electrical signal characteristic thereof; and means connected to said detector means for receiving said electrical signal and displaying an indication thereof.

13. The apparatus of claim 12 including amplifier means connected to said first detector means for amplifying the detected signal, and means for applying said amplified signal to said second signal generating means.

14. The apparatus of claim 12 including means connected to said second signal generating means for reversing the phase of said second signal relative to said first signal.

15. The apparatus of claim 12 wherein said means for generating said first seismic wave signal produces a seismic signal less than about 20 milliseconds duration.

16. The apparatus of claim 12 wherein said means for generating said first seismic wave signal produces a seismic signal of greater than about one-half second duration.

17. Seismic exploration apparatus comprising a first signal generator means positioned in the earth for applying to the earth a first seismic wave signal to be transmitted through the earth and reflected from a reflecting interface; detector means positioned in the earth to receive a first seismic wavetrain originating at said first signal generator means and to provide a first detected signal; signal generator means in contact with the earth and connected to said detector means to receive therefrom a signal indicative of the characteristics of said first seismic wavetrain received by said detector means, said second-named signal generator means being responsive to said first detected signal to apply to the earth a second seismic wave signal derived from said first detected signal; delay means connected to said second-named signal generator means to control the input of said second seismic signal into the earth so that said second seismic signal and said first seismic signal arrive at a detector location substantially simultaneously; detector means in contact with the earth for receiving the resultant of said first and said second transmitted seismic wave signals; and recorder means connected to said second-named detector means for providing a record of said detected resultant wherein multiple reflections of said first seismic wave signal are selectively altered.

18. Seismic exploration apparatus comprising signal generator means for applying to the earth a first seismic wave signal to be transmitted through the earth and reflected from a reflecting interface; detector means positioned in the earth to receive said first transmitted seismic wave signal; recorder means connected to said detector means for making a reproducible record of the seismic signals received by said detector means; means connected to said recorder means for playing back a function of said recorded signals at a preselected time; signal generator means connected to said playback means and in contact with the earth for applying to the earth a second seismic wave signal derived from said transmitted first seismic wave signal; means for repeating the application of said first seismic wave signal to the earth at a preselected time; detector means in contact with the earth for receiving said repeated first transmitted seismic wave signal and said second transmitted seismic wave signal; means for correlating the timing of the application to the earth of said repeated first seismic wave signal and said second seismic wave signal so that the transmitted repeated first seismic wave signal and said transmitted second seismic wave signal arrive at said second detector means substantially simultaneously; and recording means connected to said second-named detector means for providing a record of the seismic wave signals received by said second detector means, wherein multiple reflections of said repeated first seismic wave signal are selectively altered.

19. The apparatus of claim 18 wherein: said means for generating said first seismic wave signal is positioned below the surface of the earth; said means for generating said second seismic wave signal is positioned adjacent the surface of the earth.

20. The apparatus of claim 18 wherein: said first-named detector means is a vertical spread of spaced apart detectors positioned in the earth below its surface; and said second-named detector means is a horizontal spread of spaced apart detectors adjacent the surface of the earth.

21. The apparatus of claim 20 wherein the detectors of said vertical spread are composited to detect down-traveling seismic signals.

22. Seismic exploration apparatus comprising signal generator means for applying to the earth a first seismic wave signal to be transmitted through the earth; control means connected to said signal generator means for supplying thereto an electrical signal of predetermined characteristics; detector means in contact with the earth for receiving said transmitted first seismic wave signal; recorder means connected to said detector means for providing a reproducible record of the said transmitted first seismic wave signal received thereby; playback means connected to said recorder means and to said signal generator means for producing at a preselected time an electrical signal which is a function of said recorded signals; means for adding the electrical signal from said control means and said playback means to supply to said signal generator means a third electrical signal which is a function of said transmitted first seismic wave signal and of said control signal; detector means in contact with the earth for receiving seismic wave signals which are the resultant of said added signals supplied to said signal generator means; and recorder means connected to said second-named detector means for providing a record of the seismic wave signals received thereby wherein multiple reflections of said first seismic wave signal are selectively altered.

23. Seismic exploration apparatus comprising signal generating means for applying to the earth a first seismic wave signal to be transmitted through the earth; control means connected to said signal generating means for supplying thereto a first electrical signal of predetermined characteristics; first detector means in contact with the earth for receiving said transmitted first seismic wave signal as a first detected signal; means connected to said first detector means and to said signal generator means for producing a second electrical signal which is a function of said first detected signal; means for adding said first electrical signal of said predetermined characteristics from said control means and said second electric signal to supply to said signal generator means a third electric signal which is a function of said transmitted first seismic wave signal and of said control signal; second detector means in contact with the earth for receiving seismic wave signals which result from said third electric signal supplied to said signal generator means; and recorder means connected to said second detector means for providing a record of the seismic wave signals received thereby wherein multiple reflections of said first seismic wave signal are selectively altered.

24. The apparatus of claim 22 wherein: said signal generator means is a transducer positioned adjacent the surface of the earth; and said first detector means is a vertical spread of spaced apart detectors positioned below said signal generator means.

25. The apparatus of claim 17 wherein: said first-named signal generator means is a distributed charge; said first-named detector means is a vertical spread of detectors; said second-named signal generator means is an electromechanical transducers.

26. Seismic exploration apparatus comprising a first signal generator means positioned in the earth beneath its surface for applying to the earth a first seismic wave signal to be transmitted through the earth and reflected from a reflecting interface in the earth; first detector means positioned in the earth below the level of said first signal generator means to receive up-traveling reflections of said first seismic wave signal; amplifier means connected to said first detector means for amplifying a signal therefrom; delay means connected to said amplifier means; a second signal generator means for generating a second seismic wave signal, said second signal generator means being connected to said delay means to apply said second seismic wave signal to the earth at a predetermined time; second detector means in contact with the earth for receiving seismic wave signals originating at said first and said second signal generator means; recorder means connected to said second detector means for providing a seismographic trace of signals produced thereby wherein multiple reflections of said first seismic wave signal are selectively altered with respect to primary reflections thereof.

27. Seismic exploration apparatus comprising signal generator means positioned in the earth for applying to the earth a first seismic wave signal; first detector means positioned in the earth at a level below said signal generator means to receive seismic wave signals transmitted from said signal generator means; amplifier means connected to said first detector means for amplifying signals therefrom; delay means connected to said amplifier means; recorder means connected to said delay means for reproducibly recording signals from said first detector means; playback means connected to said recorder means; a second signal generator means connected to said playback means and in contact with the earth for applying to the earth a second seismic wave signal derived from said first seismic wave signal; second detector means in contact with the earth for receiving seismic signals originating at said first and said second signal generator means; recording means connected to said second detector means for providing a record of the seismic wave signals received thereby, wherein multiple reflections of said first seismic wave signal are selectively altered with respect to primary reflections thereof.

28. Seismic exploration apparatus comprising a signal generator means in contact with the earth for applying to the earth a first seismic wave signal; control means connected to said signal generator means for supplying thereto a first electrical signal of predetermined characteristics; first detector means in contact with the earth at a level below said signal generator means for receiving first seismic wave signals originating at said signal generator means; amplifier means connected to said first detector means; delay means connected to said amplifier means; recorder means connected to said delay means for recording signals from said first detector means; playback means connected to said recorder means and to said signal generator means for producing at a preselected time an electrical signal which is a function of said recorded signals; means for adding electrical signals from said control means and said playback means to supply said signal generator with a third electrical signal which is a function of said control signal and the transmitted first seismic wave signal and to cause said signal generator means to apply to the earth a second seismic wave signal; second detector means in contact with the earth for receiving said second seismic wave signal transmitted through the earth; and recorder means connected to said second detector means for providing a record of the seismic signals received thereby wherein multiple reflections of said first seismic wave signal are selectively altered with respect to primary reflections thereof.

29. The apparatus of claim 12 wherein there is provided a single detector means to receive said first transmitted signal and said resultant signal.

30. The apparatus of claim 18 wherein a single detector means is positioned within the earth to receive said first transmitted seismic wave signal and said repeated first transmitted seismic wave signal.

31. The apparatus of claim 18 wherein a single detector means is positioned at the earth's surface to receive said first transmitted seismic wave signal and said repeated first transmitted seismic wave signal.

32. The apparatus of claim 22 wherein: said signal generator means is positioned at the earth's surface and a single detector means is positioned at the surface of the earth to receive said transmitted first seismic wave signal and said resultant seismic wave signals.

33. The apparatus of claim 23 wherein said signal generating means is positioned at the earth's surface and a single detector means is positioned at the earth's surface to receive said transmitted first seismic wave signal and said resulting seismic wave signals.

34. Seismic exploration apparatus for use in areas of the earth covered by water which apparatus comprises seismic wave generator means immersed in water covering an area of the earth to be explored and for applying to the earth a first seismic wave signal; first detector means positioned in said water to receive said first seismic wave signal after transmission from said seismic wave generator means and for producing a first detected signal; means connected to said first detector means and responsive to said first detected signal therefrom to generate a second seismic wave signal derived from said first detected signal and for applying said second seismic wave signal to the earth at such a time as to arrive at a detector location substantially simultaneously with said first transmitted seismic wave signal; second detector means positioned to receive the resultant of said first and said second transmitted seismic wave signals and for producing an electrical signal characteristic thereof; and means connected to said second detector means for receiving said electrical signal and displaying an indication thereof.

35. A method of seismic prospecting which comprises transmitting a first seismic wave signal through the earth from a given location; detecting the resulting transmitted seismic signal after reflection from a reflecting interface in the earth to provide a first detected signal; recording said first detected signal; generating a second seismic wave signal from said first detected signal and transmitting said second seismic wave signal through the earth from a given location; detecting the resulting transmitted second seismic wave signal to provide a second detected signal; recording said second detected signal whereby said first detected signal and said second detected signal can be used in the determination of geological structure.

References Cited by the Examiner
UNITED STATES PATENTS

| 2,989,726 | 6/1961 | Crawford et al. | 340—3 |
| 3,073,406 | 1/1963 | Westphal | 181—.5 |
| 3,076,177 | 1/1963 | Lawrence et al. | 340—3 |

BENJAMIN A. BORCHELT, *Primary Examiner.*

SAMUEL FEINBERG, *Examiner.*

R. M. SKOLINK, *Assistant Examiner.*

UNITED STATES PATENT OFFICE
CERTIFICATE OF CORRECTION

Patent No. 3,278,893                             October 11, 1966

Daniel Silverman

It is hereby certified that error appears in the above numbered patent requiring correction and that the said Letters Patent should read as corrected below.

Column 6, line 58, for "deflecting" read -- reflecting --; column 9, line 18, for "adder 152" read -- adder 162 --; column 10, line 20, for "sued" read -- used --; column 13, line 28, for "20 milliseconds" read -- 200 milliseconds --; column 15, line 3, for "transducers" read -- transducer --.

Signed and sealed this 5th day of September 1967.

(SEAL)
Attest:

ERNEST W. SWIDER                            EDWARD J. BRENNER
Attesting Officer                                 Commissioner of Patents